Figure 1:
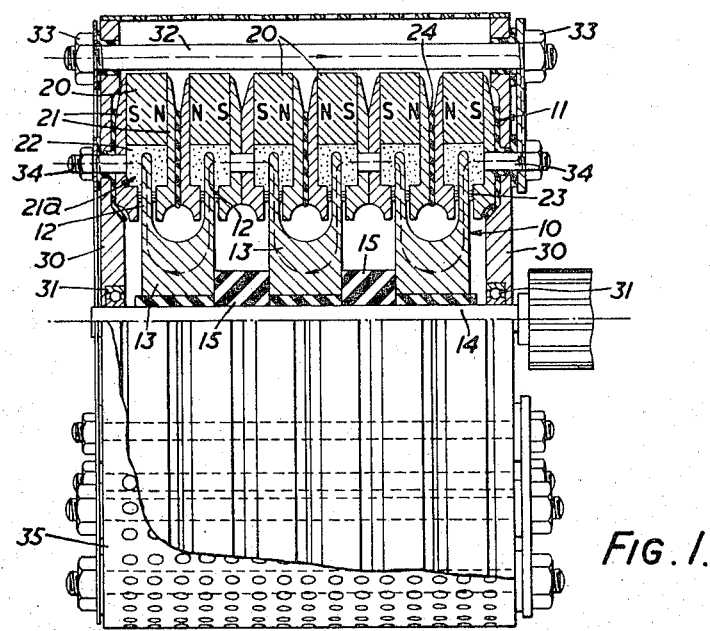

Dec. 20, 1966  G. R. POLGREEN  3,293,470

ELECTROMAGNETIC MACHINES

Filed May 8, 1963  2 Sheets-Sheet 1

INVENTOR
Geoffrey Richard Polgreen
BY
Mason, Mason & Albright
ATTORNEY

United States Patent Office 3,293,470
Patented Dec. 20, 1966

3,293,470
ELECTROMAGNETIC MACHINES
Geoffrey Richard Polgreen, Undercoombe,
Wendover, Buckinghamshire, England
Filed May 8, 1963, Ser. No. 278,967
Claims priority, application Great Britain, May 9, 1962,
17,764/62
13 Claims. (Cl. 310—178)

This invention relates to electromagnetic machines, in particular electric motors and electric generators.

According to one aspect, the present invention provides an electromagnetic machine in the form of a direct current motor or in the form of a direct current generator, wherein the flux is provided by permanent magnets formed of barium ferrite or similar permanent magnetic ceramic material.

According to another aspect, the present invention provides an electromagnetic machine in the form of a direct current motor, or in the form of a direct current generator, comprising a rotor member and a stator member, each comprising one or more sets of elements, the set or each set comprising in one said member means defining two magnetic circuits each including an annular flux gap and a source of magnetic flux provided by barium ferrite or similar permanent magnetic ceramic material, and in the other said member two annular conductors each extending through a separate one of the flux gaps and effecting sliding contact with a further conductor disposed beyond the flux gap, all of said conductors being electrically interconnected in series so that, when the machine is operated as a motor, a current passed through said conductors flows in one direction through one flux gap and in the opposite direction through the other flux gap cutting lines of flux in each flow direction or, when the machine is operated as a generator, rotation of the rotor effects movement of the said annular conductors relative to the flux path through the flux gaps thereby effecting generation of a direct current in said conductors which flows in one direction through one flux gap and in the opposite direction through the other flux gap.

The present invention further provides an electromagnetic machine, in the form of a direct current motor or in the form of a direct current generator, comprising a rotor member and a stator member, each having one or more sets of elements, the set or each set comprising in one member two axially-spaced annular permanent magnets of barium ferrite or similar permanent-magnetic ceramic material, each having an annular pole piece on axially opposite sides thereof, the two pole pieces associated with each permanent magnet defining an annular flux gap radially spaced from the permanent magnet, and in the other member two annular conductors each extending in the radial direction through a separate one of the flux gaps and effecting sliding contact with a further conductor disposed beyond the flux gap, all of said conductors being electrically interconnected in series so that, when the machine is operated as a motor, a current passed through said conductors flows radially inwardly through one flux gap and radially outwardly through the other flux gap cutting lines of flux in each flow direction and thereby effecting rotation of the rotor or, when the machine is operated as a generator, rotation of the rotor effects movement of the annular conductors relative to the flux path through the flux gaps thereby effecting the generation of a direct current in said conductors which flows radially inwardly through one flux gap and radially outwards through the other.

This construction enables a motor so formed to be operated by a very heavy current at very low voltage, for example the output of a fuel cell, but the principles of the invention are also applicable to the construction of a generator for producing such a current.

Briefly one particular form of such a motor is provided with a rotor formed by a plurality of coaxial discs, made of or coated with a high conductivity metal. The discs are arranged in pairs which are electrically interconnected adjacent their hubs whilst the adjacent discs of each adjacent pair are electrically interconnected adjacent their periphery. This latter interconnection is effected through stationary annular current collectors, which make sliding contact with the annular peripheral portions of the surface of the respective discs. The discs are thus electrically interconnected in series. If therefore an electrical potential is applied across the outermost discs of the series of discs, a current flow takes place which is directed alternately radially inwards and radially outwards along adjacent discs. By disposing annular pole pieces, preferably in the form of annular pole plates, on opposite sides of each disc with their polarities suitably arranged, by the interaction between the radially directed current through each disc and the flux path between co-operating magnetic poles on opposite sides of the disc, which is therefore directed normal to the surface of the disc, a substantial mechanical torque is produced.

Figure 2:
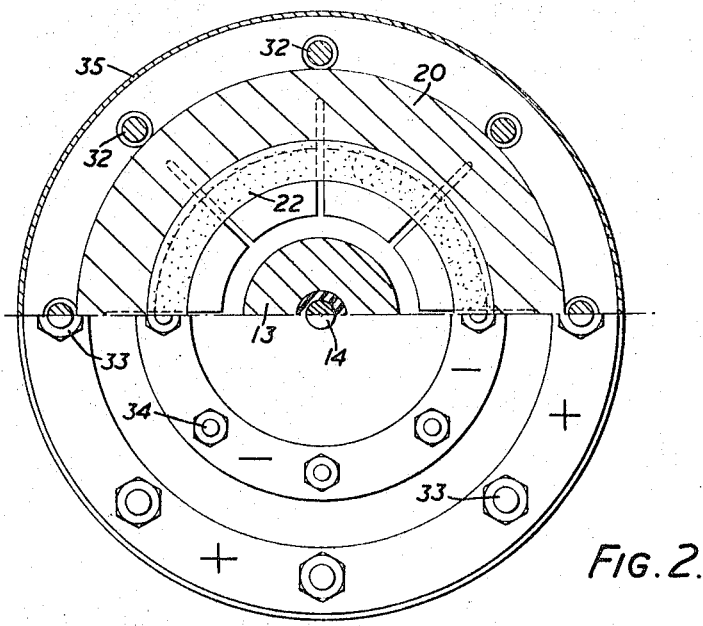
Figure 3:
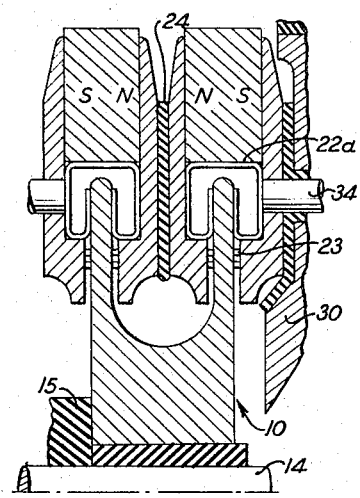
Figure 4:
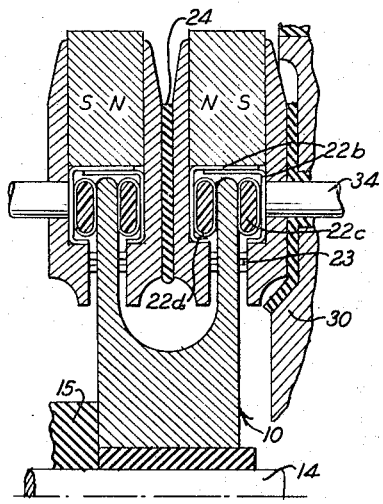
Figure 5:
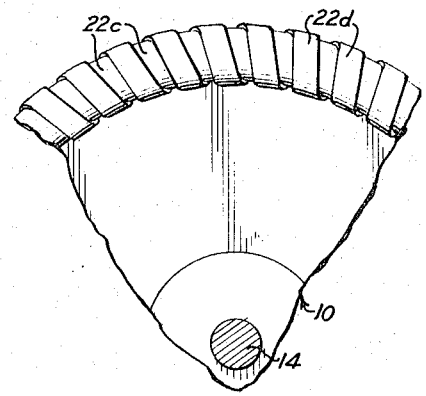

Having described the basic principles of the invention, by reference to one form of motor embodying them, the construction of this embodiment of the invention will now be more particularly described by way of example only, with reference to the accompanying drawings in which:

FIG. 1 is a side elevation, part-sectioned of a motor in accordance with the invention, FIG. 2 is an end elevation, part-sectioned of the motor of FIG. 1, FIGS. 3 and 4 are detail views of part of the motor of FIG. 1 showing modified forms of current collector, and FIG. 5 is an axial view of part of the current collector shown in FIG. 4.

As shown in FIG. 1, the motor comprises a rotor member 10 and a stator member 11, the rotor member comprising one or more pairs of annular conducting discs 12. Each pair of conducting rotor discs is made of aluminium and formed integral with a hub 13, the discs being plated with nickel. These hubs in turn are mounted on a steel rotor shaft 14, electrical insulation being provided between the hubs and the shaft, for example by anodising the interior of each hub. It will thus be seen that each pair of discs and its supporting hub forms a bobbin-type structure, adjacent bobbins being axially spaced apart by a spacing member 15 located on the rotor shaft. Alternatively each disc could be made separately from the hub and secured to the hub through low resistance bolts or the like. The hubs are fixed to the shafts by insulating keys or by any other suitable means.

Surrounding each conducting disc is a permanent magnet 20 of annular shape and formed of barium ferrite, in particular of the oriented grade, or other like permanent magnetic ceramic material. Clamped to the opposite side faces of each magnet are two annular pole plates 21 of steel which extend radially inwards from the magnet and lie with their pole faces, which define the flux gap, closely adjacent to the associated conducting disc. Each pair of pole plates embraces substantially the whole of the disc extending radially outwardly from the supporting hub.

The annular ferrite magnets are magnetised in the axial direction so that the large parallel opposite faces constitute the poles, and the magnets are assembled with adjacent faces of similar polarity. Thus in each cooperating pair of discs the passage of direct current will be from the periphery of one conducting disc to the hub thereof, and from the hub to the periphery of the next disc, and this current will cut the magnetic flux from the magnets in a manner and direction which cause rotation of the two discs in the same sense.

The annular portion of each pole plate which lies adjacent the annular outer portion of each conducting disc is recessed to provide a space 21a for accommodating a current collector or brush 22. Preferably at least half of the area of each rotor disc extending outwardly from the hub lies within this collecting zone so that relatively low current densities are possible, giving minimum frictional losses with contact resistance approaching that of the non-moving parts of the circuitry. Moreover, the heat generated can be readily conducted away into the massive surrounding ferrite magnets and pole plates which act as heat sinks. In this respect, the present design is greatly superior to conventional D.C. motors in which the surrounding electromagnetic field continuously generates heat which complicates the cooling of the machine and limits its performance.

Since the contact surfaces between the current collectors and the discs are smooth and continuous, and the voltage across them is well below the minimum arcing potential for the metals used, it is possible to use much simpler current collectors than those of a conventional D.C. machine with a commutator and substantial voltage drop.

Each current collector is preferably a liquid conductor, and is maintained in the annular space 21a by dynamic seals 23 between the disc and the adjacent pole pieces. However, the centrifugal effect of the disc on the liquid reduces the likelihood of leakage of the liquid conductor. The liquid conductor may for example be mercury, a sodium-potassium metal alloy, or a colloidal graphite suspension, or other electrically conducting lubricant, and may be freely contained in the space 21a or at least partially absorbed in a porous sintered mass, for example bronze. However, one alternative form of current collector shown in FIG. 3 is a plurality of leaf springs 22a, extending around the space and formed of a springy alloy of copper, such as beryllium copper or phosphor bronze, each leaf spring being supported on one of the pole pieces and making sliding engagement with a disc, a suitable conducting lubricant being used to reduce wear. As a further alternative shown in FIGS. 4 and 5, each current collector could be made in two interconnected parts located on opposite sides of a disc, each part comprising a thin brass backing ring 22b faced with a soft flexible substance 22c, such as a high temperature grade of foam rubber, which is toroidally wound with a layer of narrow Phosphor bronze strip 22d, adjacent turns of the strip nearly touching at the inner periphery of the ring. The backing rings associated with each conducting rotor disc are in this case electrically connected across the top of the disc close to the inner surface of the ferrite ring magnet.

In each case, the two current collectors 22 associated with each pair of rotor discs 12 are insulated from each other by placing insulating material 24 between the two pole plates which lie between them, but each is connected either to one terminal of the motor or to the next adjacent current collector.

Since the magnets are magnetised in a direction parallel to the axis of the machine with like poles adjacent one another, the inner part of the pole plates between the discs forms a single concentric magnetic pole, and the bobbin-shaped rotor is equivalent to a single turn of an armature conductor. If now a direct current of a thousand amps, or several thousand amps, is passed through the latter, the magneto-motive force or ampere-turns of the rotor discs will match those of the permanent magnetic field, since the coercivity of the ferrite magnets may be up to 3000 oersted, and their magnetic length (distance between poles) for example in the region of 1 to 4 centimetres.

The current through the discs causes a concentric flux which is the equivalent of armature reaction, and this can be minimised by cutting a pattern of radial slots in the pole plates.

Since leakage flux must be minimised with these very high coercivity magnets, this is achieved in the present design by making the external magnetic circuit symmetrical and extremely short. By the use of a liquid current collector extending on each side of each disc, axial pressure is negligible and relatively thin discs of a few millimetres thickness may be used. Thus the "air" gap length between adjacent pole plates can be very short.

Magnetic flux leakage is also minimised by the use of aluminium alloy end plates 30 between which the assembly of magnets and pole plates is clamped. The end plates also support bearings 31 for the steel rotor shaft, and since also the hub of each rotor bobbin is preferably formed of aluminium, the formation of eddy currents in it during rotation is minimised by thus isolating it magnetically from the pole plates.

The clamping of the magnets and pole plates is effected by aluminium bolts 32 which are anodised to insulate them electrically from the end plates, the ends of the bolts supporting clamping nuts 33. In place of brass or aluminium, another non-magnetic but conducting material can be used, so that the bolts, if suitably insulated from the end plates, can serve as conductors to provide a conducting path for current entering or leaving the machine. Each outermost current collector of the machine makes contact with a conducting bolt 34 passing through the adjacent end plate of the machine, but insulated therefrom, and such a bolt can act to lead current into or out of the end current collector directly or via one of the clamping bolts 32. In this way low resistance paths are provided for current entering and leaving the machine. The stator of the motor is surrounded by a perforated housing or cover 35.

One application of a machine according to the design described above is to drive a typical small vehicle, for example a motor car, the motor having an output of about 10 H.P. Such a motor will drive the wheels of the vehicle through reduction gearing, and can also act as a generator, for regenerative braking. Such a motor may for example be installed with the reduction gearing inside, or closely adjacent to, the wheel, or to each wheel to which driving torque is to be applied. This design however is also applicable in the form of a generator of low voltage direct current for coupling to a high speed prime mover such for example as a gas turbine.

By reason of the symmetrical design of the machine described above, eddy current and hysteresis losses are negligible, so that it is not necessary to laminate the magnetic circuits because the flux does not alter substantially in value in any part of the circuit.

The use of permanent magnet excitation represents a substantial economy in power, and the inherent "multiple fin" structure of the design provides excellent natural cooling.

It will be appreciated from the above description that by the use of ferrite magnets in the manner described and illustrated, double-disc homopolar units as thin as two or three inches can be made. A number of these units can be thus fixed together on a common shaft in a single machine and connected together in series so that the voltage of a relatively small machine at conventional rotating speeds matches that of a battery cell or fuel cell. The drawing illustrates three such units, but more could be used in a generator coupled to a prime mover, and less, i.e. one or two, used as hub motors in each wheel of a vehicle as combined motors and dynamic brakes, all being connected in series to the traction battery through suitable control gear.

I claim:
1. An electromagnetic machine comprising a rotor member, a stator member, at least one set of elements in each said member, said set comprising in one said member means defining two magnetic circuits each including an annular flux gap and a source of magnetic flux provided by permanent magnetic ceramic material and current collecting means mounted on the circuit-defining means but spaced from said flux gap, each set comprising in the other said member two annular conductors each extending through a separate one of the flux gaps into sliding contact with a respective one of said current collecting means, means electrically interconnecting all said conductors and current collecting means in series so that a current path is formed through said conductors for the flow of current in one direction through one flux gap and in the opposite direction through the other flux gap cutting lines of flux in each flow direction.

2. A machine according to claim 1, wherein said annular conductors and said flux gaps lie in planes normal to the axis of rotation of the rotor member.

3. An electromagnetic machine comprising a rotor member, a stator member, at least one set of elements in each said member, said set comprising in one member two axially-spaced annular permanent magnets of permanent-magnetic ceramic material, an annular pole piece on axially opposite sides of each said magnet, the two pole pieces associated with each permanent magnet defining an annular flux gap radially spaced from the permanent magnet, each set in the other member comprising two annular conductors each extending in the radial direction through a separate one of the flux gaps, and further comprising a further conductor fixed relative to the pole pieces and disposed beyond each flux gap in sliding contact with a respective annular conductor, and means electrically interconnecting all said conductors in series to define a current flow path which extends inwardly through one flux gap and radially outwardly through the other flux gap cutting lines of flux in each flow direction.

4. A machine according to claim 3 wherein said permanent magnetic ceramic material is barium ferrite.

5. A machine according to claim 3, wherein said annular conductors form part of said rotor member.

6. A machine according to claim 3, wherein said magnets and pole pieces form part of said stator member, said stator member further comprising a pair of annular end plates embracing the permanent magnets and pole pieces therebetween and means mechanically interconnecting the end plates to clamp the assembly of plates, pole pieces and magnets.

7. A machine according to claim 5 having a rotor hub, means mounting each said annular conductor on said hub and means electrically insulating each said annular conductor from said hub.

8. A machine according to claim 5 wherein each said further conductor is disposed within a cavity defined between the corresponding rotary annular conductor, the pole pieces and the permanent magnet.

9. A machine according to claim 8, wherein each said further conductor is an electrical brush formed by a toroidal winding of conducting tape.

10. A machine according to claim 8, wherein each said further conductor comprises a plurality of conducting leaf springs.

11. A machine according to claim 8 wherein each said further conductor comprises a porous sintered-mass impregnated with an electrically-conductive lubricant.

12. An electromagnetic machine comprising a rotor member and a stator member, said stator member having at least one set of elements, said set comprising two axially spaced annular permanent magnets made of barium ferrite, annular pole pieces on axially opposite sides of each said magnet, the two pole pieces associated with each permanent magnet defining an annular flux gap radially spaced from the permanent magnet and further defining an annular cavity disposed between the flux gap and the permanent magnet, and a stationary conductor mounted in each said annular cavity, said rotor having a hub and at least one set of elements, said set comprising two annular conductors, means mounting said annular conductors on said hub, means electrically insulating said annular conductors from said hub and means electrically interconnecting said two annular conductors of said set, each said annular conductor extending radially outwardly through a said flux gap into sliding contact with a said stationary conductor, to form a current flow path which extends from a said stationary conductor of said stator to a said annular conductor of said rotor, and via a second annular conductor of said rotor to a second stationary conductor of said stator, said path extending radially inwardly through one flux gap and radially outwardly through another flux gap.

13. An electromagnetic machine comprising a rotor member and a stator member, said stator member having elements, including annular permanent magnet elements made of barium ferrite, which define two magnetic circuits each having an annular radially-extending flux gap and further define two annular cavities each communicating with a separate one of the flux gaps, and a current collector fixed in each said annular cavity, said rotor having a hub, two annular conductors, means mounting said annular conductors on said hub, means electrically insulating said annular conductors from said hub and means electrically interconnecting said two annular conductors, each said annular conductor extending radially outwardly through a said flux gap into sliding contact with a said current collector, whereby a current flow path is formed from a said current collector of said stator to a said annular conductor of said rotor, and via a second annular conductor of said rotor to a second current collector of said stator, which path extends radially inwardly through one flux gap and radially outwardly through another flux gap.

References Cited by the Examiner
UNITED STATES PATENTS

| 2,345,835 | 4/1944 | Serduke | 310—178 X |
| 2,755,398 | 7/1956 | Merunovich | 310—178 |
| 3,090,877 | 5/1963 | Bkumhart | 310—154 |

MILTON O. HIRSHFIELD, *Primary Examiner.*

L. L. SMITH, *Assistant Examiner.*